United States Patent Office 3,168,364
Patented Feb. 2, 1965

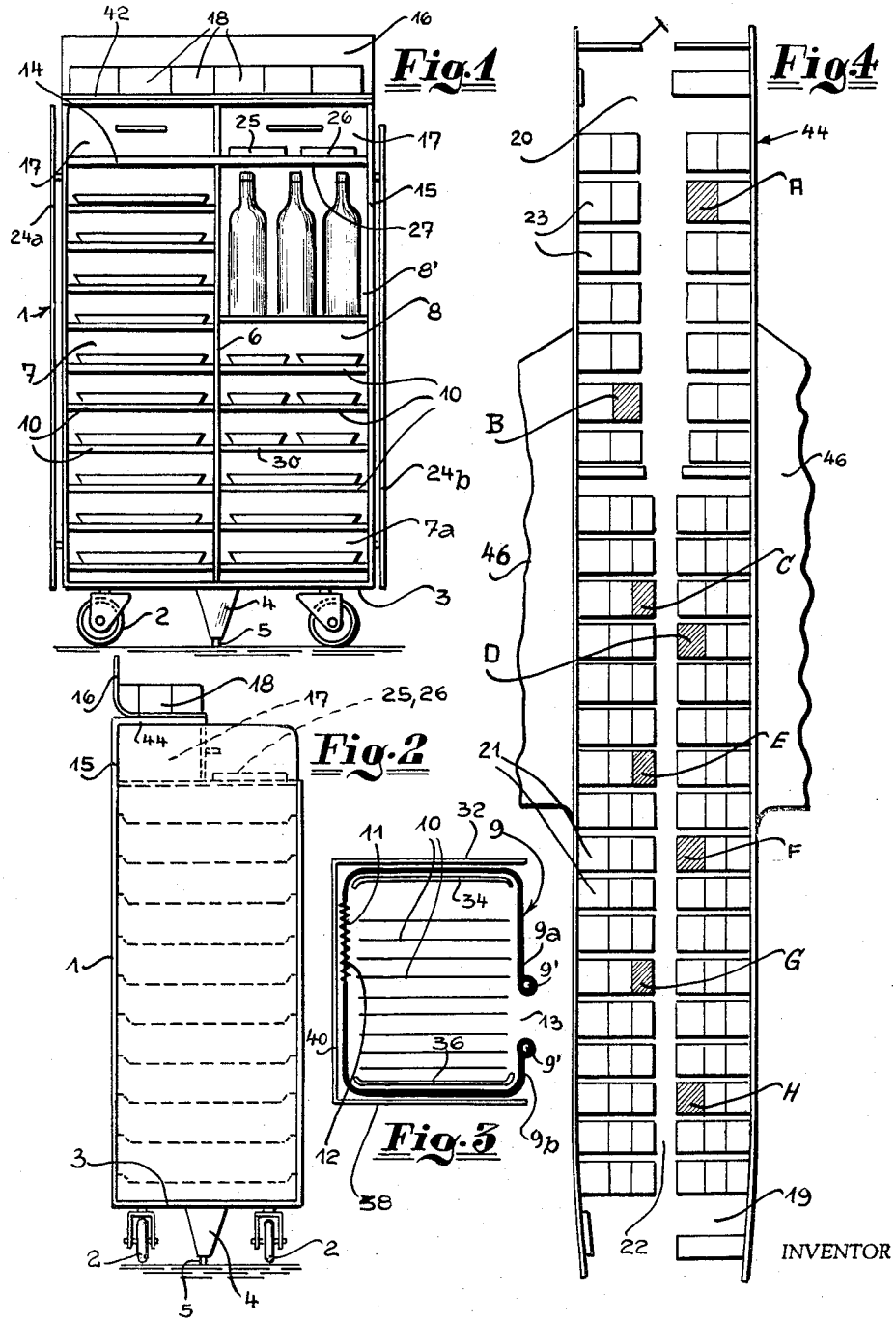

3,168,364
AIRCRAFT CABIN WITH STORAGE CABINET
FOR FOOD
Norbert Schaefer-Sell, Kleckerwaldweg 587,
Jesteburg, Kreis Harburg, Germany
Filed Feb. 1, 1963, Ser. No. 255,555
Claims priority, application Germany, Feb. 1, 1962,
Sch 30,917
2 Claims. (Cl. 312—297)

This invention relates in general to a passenger aircraft cabin arrangement and to food serving cabinets therefor, and in particular to a new and useful aircraft cabin construction with means disposed therein for accommodating transportable food cabinets which may be installed at spaced locations throughout the aircraft cabin adjacent the passenger seats, the aircraft including electrical connections at such locations for maintaining various sections or areas of the cabinet hot or cold.

The serving of food and beverages in aircraft to the passengers is not only a necessity during steady and long flights, but it is also an important factor on short or medium flights as a means for diverting and occupying the passengers.

At the present time, most aircraft are equipped with kitchen compartments which include elaborate structures or cabinet elements with suitable refrigerating and heating spaces for the storage of complete meals and beverages. A disadvantage of a single kitchen compartment is that it is not readily accessible to all areas of the aircraft, and this is particularly true when the cabin is divided into first class and tourist class sections. The stewardess who serves meals from a central kitchen must deliver food trays to passengers located at remote areas of the cabin in respect to the kitchen, and in most instances the serving takes a long period of time and is not particularly convenient, both in respect to the passengers and to the stewardess. In those instances where wheeled serving tables are employed, the serving takes an additional long period of time and a further disadvantage ensures that the aisle is continually blocked at the location of the serving table.

In accordance with the present invention, there is provided an aircraft cabin construction or layout which advantageously includes food storage locations at regularly spaced intervals throughout the length of the aircraft cabin, preferably oriented at the end of an aisle of seats and preferably of a size to accommodate a cabinet which will occupy substantially the same space as a single passenger seat. With an arrangement of this nature, it is possible to provide electrical means for heating and cooling cabinets which are positioned over the selected space, which cabinets advantageously include hot and cold compartments for the heating and/or cooling of the foodstuffs at desired temperatures. A particular advantage of the arrangement is that the cabinets are always located in a position which permits them to be employed for serving a maximum number of passengers within a prescribed area by the transporting of the food materials a minimum of distance. With the arrangement proposed by the present invention, no additional space in the aircraft cabin is required, since the usual large-size kitchen area may be removed and replaced with passenger seats.

In accordance with one feature of the invention, there is provided an improved cabinet construction for positioning in an aircraft of this character which includes a connection which may be made preferably from the lower portion to define an outlet in the aircraft for instantly providing power in the cabinet for heating or cooling the food to be contained therein. The cabinet is advantageously of a novel construction which includes front closures or doors which may be swung approximately 270° to overlie the sides of the cabinet when the food is to be served therefrom. A particular feature is that the individual compartments in the cabinet which contain food trays are maintained in a closed condition by an arrangement of slide elements or rolling shutters which are biased by spring means to close all but one compartment, that is, the compartment from which food is being served. An advantage of the rolling shutter construction is that the shutters may be used in unison to open a selected compartment at a time and to ensure that the remaining compartments are maintained at their desired temperature level without being opened to the cabin temperature which may cause a rapid cooling or heating, as the particular case may be.

A cabinet of the type of the invention is advantageously arranged at selected locations throughout the passenger cabin in a strategic position that serves a maximum number of passengers in that particular area. They are advantageously located at an end of an aisle of seats of a size which compares to the space which is normally occupied by a single seat. The number of the cabinets, of course, depends on the capacity of the aircraft and the number of seats in the passenger space, and since they are removable, they can be interchanged with passenger seats with little difficulty. The cabinets advantageously include rollers to permit them to be transported into and out of the aircraft easily, so that a new set of cabinets may be installed in a simple manner at each aircraft stop, as desired. The roller shutter constructions of the cabinets are advantageously arranged so that they open in a direction toward the central aisle, and the food may be handled by a stewardess in the aisle.

Accordingly, it is an object of this invention to provide an improved aircraft cabin arrangement.

A further object of the present invention is to provide a food cabinet for use in aircraft and the like which includes a temperature-controlled space divided into a plurality of compartments and with an improved roller shutter means for selectively opening the compartment which comprises a first roller shutter adapted to be moved upwardly and downwardly over the compartment and a second roller shutter adapted to move in a similar manner from the opposite end of the cabinet, the roller shutters being connected at their inner ends and extending adjacent the respective top and bottom walls of the cabinet, the arrangement being such that a single compartment at a time may be opened by the manipulation of the two roller shutters in unison.

A further object of the invention is to provide a storage cabinet for foodstuffs and the like which includes an open front wall, a pair of roll shutter elements arranged adjacent the bottom and top walls, respectively, and including inner end portions which are connected together by spring means and outer end portions which extend downwardly from the top portion and upwardly from the bottom portion, respectively, for closing the front wall, the springs normally biasing the roll shutters together at the front wall for closing at least a portion of the front space, and the shutters being movable against the biasing force of the spring to open the front wall.

A further object of the invention is to provide an aircraft cabin and food serving cabinet arrangement which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a front elevation of a food storage and serving cabinet constructed in accordance with the invention;

FIG. 2 is a side elevation of the cabinet of FIG. 1;

FIG. 3 is a schematic transverse sectional view on a smaller scale of a portion of the cabinet indicated in FIG. 1, showing the roller shutter construction; and FIG. 4 is a partial top plan view of the passenger space of an aircraft cabin constructed in accordance with the invention.

Referring to the drawings in particular, the invention embodied therein includes a cabinet for food storing and serving, generally designated 1, particularly constructed for use in aircraft, and which includes a bottom wall 3 which is supported on rollers or casters 2. The bottom wall 3 includes a depending anchoring extension 4 provided for connection to a connecting element 5 which is advantageously provided on the floor of the passenger space of an aircraft. The connection through the extension 4 provides means for connecting the cabinet 1 to the power supply for operating means for maintaining various components of the cabinet at selected temperatures, and also provides means for anchoring the cabinet in the designated area of the aircraft.

In the embodiment of the cabinet 1 indicated, there is provided a central partition wall 6 and an upper cross wall 14 which divides the cabinet into high temperature compartments or heating spaces 7 and 7a, and a low temperature compartment or cooling space 8 located above a horizontal wall 30 and on one side of the partition 6.

In the preferred arrangement, each space 7, 7a, and 8 is advantageously closeable by individual sets of rolling shutters generally designated 9 (FIG. 3). As indicated in FIG. 3, the rolling shutter set 9 comprises an upper rolling shutter part 9a and a lower rolling shutter part 9b which are guided between spaced horizontal walls 32 and 34 and 36 and 38, respectively. The inner ends of the rolling shutter elements 9a and 9b are advantageously connected by a coil spring or pulling string 11 which is guided by rod elements 12 which extend between the ends of the shutter elements. The connected ends of the shutter elements are advantageously guided along a rear wall 40 of the compartment or space which it serves. The length of the rolling shutter parts 9a and 9b is advantageously made such that the handle end portions 9', 9' will be spaced apart by the normal action of the spring 11 by an amount indicated 13 which is advantageously equivalent to the space or height between adjacent ones of a plurality of horizontally disposed storage shelves 10 arranged in each compartment. By grasping one or both of the knob ends 9', 9' it is possible to displace the two rolling shutters 9a and 9b simultaneously in order to open one compartment space between shelves 10 at one time. In this manner, the food trays or containers stored on the various shelves may be withdrawn one at a time and the spaces of all the other shelves will be maintained closed. Thus, it is possible to withdraw a food container from respective compartment portions without causing unnecessary heat losses (or gains, as the case may be) in the other compartments. The knob elements 9', 9' are advantageously provided with latching means which permit them to be drawn together against the force of the spring 11 for closing of all of the compartments, if so desired. The normal biasing of the spring 11, however, should advantageously be such that the spacing between the knob elements 9, 9' is equivalent approximately to the spacing between the shelves 10.

The cabinet 1 also includes a head box portion 15 which is arranged above the top wall 14 which carries a drawer 17, 17 for depositing silverware, condiment containers, packages, and the like. An outer top wall 42 provides a support or a storage element 44 which includes an outer front cover 16 which is pivotally connected to the inner portion and may be swung between the closed position indicated in FIG. 1 to the open position indicated in FIG. 2. The swingable cover 16 advantageously includes compartments or shelves 18 for depositing glasses, chinaware and the like, which may be filled when the cover portion 16 is formed to an open position.

It should be appreciated that the spaces 7, 7a and 8 may be adjusted in respect to size in accordance with the required demands. As indicated in the drawings, the cooling space 8 advantageously includes a large upper portion 8' to accommodate large-size beverage containers or bottles.

As indicated in FIG. 4, there is shown a portion of an aircraft generally designated 44 having wings 46, 46 and including a passenger space which is divided into tourist class space 19 and first class space 20. As is the custom, the tourist class is provided with three seats 21 on each side of the central aisle 22, and in the first class compartment there are two seats 23 on each side of the aisle.

In accordance with the invention, the aircraft is provided, in the first class compartment, with defined areas A and B for receiving serving cabinets 1 in accordance with the invention, and defined areas C, D, E, F, G and H for receiving the food storage and serving cabinets 1 in the tourest class section of the aircraft. The arrangement indicated shows a typical arrangement of an aircraft to provide the most efficacious use of the serving cabinet. It should be appreciated that any other arrangement, of course, may be made within the scope of the invention, i.e., to provide cabinets at strategic locations permitting the rapid serving of the passengers adjacent such locations with a minimum of handling and movement of the food trays by the stewardess to the passengers.

In the arrangement indicated in the tourist class area 19, there are six cabinets 1, each cabinet capable of holding up to seventeen meals, and in the first class compartment 20, there are only two cabinets which are arranged to hold only thirteen meals. Of course, the number of the cabinets 1 and the number of their respective food compartments or the size of the storage areas depends upon the partitioning of the respective aircraft cabin. The seat spaces which are occupied by the various serving cabinets will not be as great as the areas freed for seats which may be accommodated in the large kitchen spaces which will no longer be required due to the provision of such cabinets.

Each cabinet 1 advantageously includes wing doors 24a and 24b which are hinged in a manner to permit them to be swung to close the front wall of the cabinet or to completely open the front wall, in which instance the doors will be positioned against the side walls of the cabinet. The wing doors are advantageously finished on both sides so that they will provide decorative appearance in respect to the aircraft cabin interior. The side walls of the cabinet and also the outer surfaces of the wing door are rigidly built so that they will not suffer during transportation of the cabinets from the interior of the aircraft cabin for replacement purposes. During such transportation, the doors are advantageously oriented so that their most durable surfaces are exposed, such as in a closed position. In some instances, the top wall 14 is provided with a warming plate 25 and a cooling plate 26 which permits serving foodstuffs on such plates. The cooling plate may advantageously take the form of a dish for receiving ice cubes.

While a specific embodiment of the invention has been shown and described in detail to illustrate the application of the principles of the invention, it will be understood that the invention may be embodied otherwise without departing from such principles.

I claim:

1. A food storage and serving cabinet particularly for aircraft, comprising means dividing the interior of said cabinet into at least one temperature - controlled area which is opened at the front thereof, and a rolling shutter set for closing the front of the temperature-controlled area, comprising a first rolling shutter element, means for guiding said first rolling shutter element for movement adjacent the top wall of said temperature-controlled area and permitting a portion to extend downwardly therefrom for closing a portion of the front of said temperature-controlled area, a second rolling shutter element, means guiding said second rolling shutter element for sliding movement adjacent the bottom wall of said temperature-controlled area and permitting movement of an end portion upwardly and downwardly from the bottom along the front wall for closing a portion of said front wall of said temperature-controlled area, means, including a coil spring, connecting the inner ends of said first and second rolling shutter elements adjacent the rear of said temperature-controlled compartment, said first and second rolling shutter elements being slidable to permit portions thereof to expose a selected area of the front of said temperature-controlled cabinet; said coil spring being guided by a rod extending between said first and second rolling shutter elements.

2. A food storage and serving cabinet particularly for aircraft, comprising means dividing the interior of said cabinet into at least one temperature-controlled area which is opened at the front thereof, and a rolling shutter set for closing the front of the temperature-controlled area, comprising a first rolling shutter element, means for guiding said first rolling shutter element for movement adjacent the top wall of said temperature-controlled area and permitting a portion to extend downwardly therefrom for closing a portion of the front of said temperature-controlled area, a second rolling shutter element, means guiding said second rolling shutter element for sliding movement adjacent the bottom wall of said temperature-controlled area and permitting movement of an end portion upwardly and downwardly from the bottom along the front wall for closing a portion of said front wall of said temperature-controlled area, means, including a coil spring, connecting the inner ends of said first and second rolling shutter elements adjacent the rear of said temperature-controlled compartment, said first and second rolling shutter elements being slidable to permit portions thereof to expose a selected area of the front of said temperature-controlled cabinet; said rolling shutter portions being movable against the force of said spring to permit the opposite ends to be brought together to completely close the front of said cabinet.

References Cited in the file of this patent
UNITED STATES PATENTS

| | | |
|---|---|---|
| 538,430 | McKenzie | Apr. 30, 1895 |
| 1,002,863 | Packard | Sept. 12, 1911 |
| 1,516,866 | O'Conner | Nov. 25, 1924 |
| 1,689,900 | Williams | Oct. 30, 1928 |
| 1,986,022 | Stahl | Jan. 1, 1935 |
| 2,090,690 | Matanovich | Aug. 24, 1937 |
| 2,480,045 | Reeves | Aug. 23, 1949 |
| 2,719,069 | Roberson | Sept. 27, 1955 |
| 2,898,985 | Starr | Aug. 11, 1959 |
| 2,947,349 | Kryter | Aug. 2, 1960 |
| 2,948,798 | Ness | Aug. 9, 1960 |